United States Patent
Dharmadhikari et al.

(10) Patent No.: US 12,152,790 B2
(45) Date of Patent: Nov. 26, 2024

(54) HOT WATER UNIT SUPPLY CONTROL SYSTEMS AND METHODS

(71) Applicant: South East Water Corporation, Frankston (AU)

(72) Inventors: Ninad Dharmadhikari, Frankston (AU); David Bergmann, Frankston (AU)

(73) Assignee: South East Water Corporation, Frankston (AU)

(*) Notice: Subject to any disclaimer, the term of this patent is extended or adjusted under 35 U.S.C. 154(b) by 258 days.

(21) Appl. No.: 17/604,296

(22) PCT Filed: Apr. 15, 2020

(86) PCT No.: PCT/AU2020/050370
§ 371 (c)(1),
(2) Date: Oct. 15, 2021

(87) PCT Pub. No.: WO2020/210866
PCT Pub. Date: Oct. 22, 2020

(65) Prior Publication Data
US 2022/0196252 A1 Jun. 23, 2022

(30) Foreign Application Priority Data
Apr. 16, 2019 (AU) ................. 2019901312

(51) Int. Cl.
*F24D 19/10* (2006.01)
*F24D 17/02* (2006.01)
(Continued)

(52) U.S. Cl.
CPC ......... *F24D 19/1054* (2013.01); *F24D 17/02* (2013.01); *F24D 19/1009* (2013.01);
(Continued)

(58) Field of Classification Search
CPC .................................................. F24D 17/0073
(Continued)

(56) References Cited

U.S. PATENT DOCUMENTS 8,985,063 B2   3/2015   Adachi
2002/0050478 A1*  5/2002   Talbert .................... F28D 7/106
                                                                    210/931

(Continued)

FOREIGN PATENT DOCUMENTS

EP   2667104 A2   11/2013
EP   3477217 A1   5/2019

(Continued)

OTHER PUBLICATIONS

European Patent Office, "Search Report", in Application No. 20791645.3-1016, dated Dec. 7, 2022, 8 pages.

*Primary Examiner* — Steven B McAllister
*Assistant Examiner* — John E Bargero
(74) *Attorney, Agent, or Firm* — The Small Patent Law Group LLC; Christopher R. Carroll

(57) ABSTRACT

A hot water unit fluid supply control system for a hot water unit is disclosed. The hot water unit has a heating system that is operable in a heating cycle to heat up water in at least a first region of the water unit, and a sensor arrangement for sensing a temperature of water of the hot water unit. The control system comprises a control unit configured to: receive operational data relating to an operation of the heating system; receive temperature data from the sensor arrangement; and allow for a volume of water from the first region to be released from the hot water unit as treated water or usable water based on: the operational data, and the temperature data from the sensor arrangement.

29 Claims, 1 Drawing Sheet

(51) Int. Cl.
    *F24H 15/174*     (2022.01)
    *F24H 15/20*     (2022.01)
    *F24H 15/219*     (2022.01)
    *F24H 15/37*     (2022.01)
    *F24H 15/38*     (2022.01)
    *F24H 15/486*     (2022.01)
    *F24H 15/414*     (2022.01)

(52) U.S. Cl.
    CPC ........... *F24H 15/174* (2022.01); *F24H 15/20* (2022.01); *F24H 15/219* (2022.01); *F24H 15/37* (2022.01); *F24H 15/38* (2022.01); *F24H 15/486* (2022.01); *F24D 2200/123* (2013.01); *F24D 2220/042* (2013.01); *F24H 15/414* (2022.01)

(58) Field of Classification Search
    USPC ....................................................... 122/14.1
    See application file for complete search history.

(56) References Cited

U.S. PATENT DOCUMENTS

| | | | |
|---|---|---|---|
| 2010/0206869 A1* | 8/2010 | Nelson .................. | F24H 15/225 |
| | | | 392/441 |
| 2015/0122745 A1* | 5/2015 | Stickney ............. | F24D 19/1051 |
| | | | 210/138 |
| 2019/0277537 A1* | 9/2019 | McCullough ......... | F24H 15/144 |

FOREIGN PATENT DOCUMENTS

| | | |
|---|---|---|
| WO | WO 2013/014411 A2 | 1/2013 |
| WO | WO 2018/029880 A1 | 2/2018 |

* cited by examiner

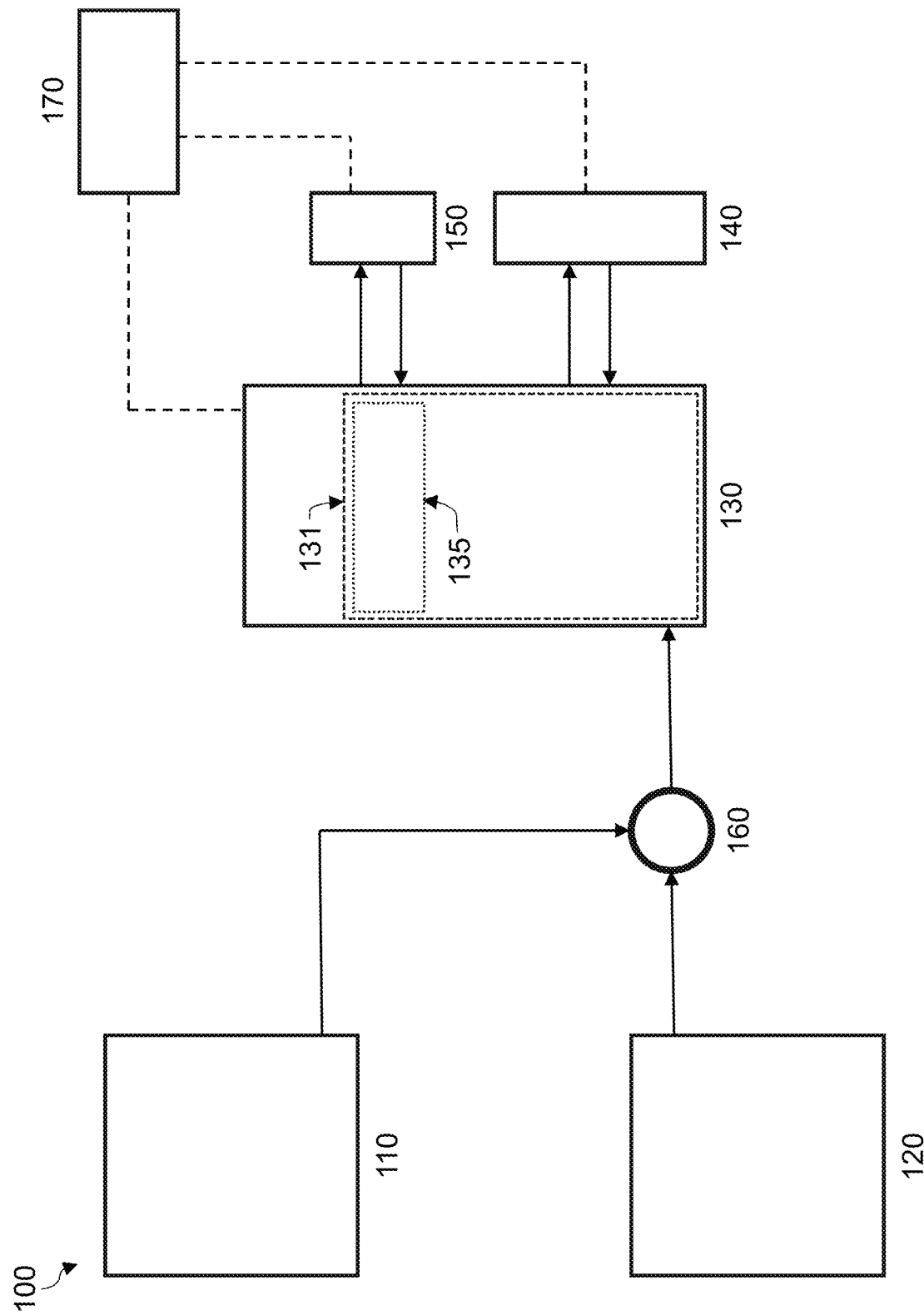

HOT WATER UNIT SUPPLY CONTROL SYSTEMS AND METHODS

FIELD OF THE INVENTION

The invention relates to systems and methods for controlling a supply of water from a hot water unit.

BACKGROUND

Existing hot water units for heating untreated water require the use of temperature sensors to detect when the water reaches a set point temperature. Once the temperature is detected to be at the set point temperature, the hot water unit stops heating. The temperature is monitored at times of flow, and if thresholds are exceeded, then the water is considered to be treated and allowed to continue to flow. If the temperature drops below the threshold the water supply to the user would be switched to a back-up safe drinking water supply. Such a system does not consider if the water has previously been above the threshold for treated water and as a result, there is an under-utilisation of water in the hot water unit.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

In this context, there is a need for an improved system and method for controlling fluid supply from a hot water unit.

SUMMARY OF THE INVENTION

According to an aspect of the present invention, there is provided a hot water unit fluid supply control system for a hot water unit, the hot water unit having: a heating system that is operable in a heating cycle to heat up water in at least a first region of the water unit, and a sensor arrangement for sensing a temperature of water of the hot water unit, the control system comprising a control unit configured to: receive operational data relating to an operation of the heating system; receive temperature data from the sensor arrangement; and allow for a volume of water from the first region to be released from the hot water unit as treated water or usable water based on: the operational data, and the temperature data from the sensor arrangement.

In one example, the heating system preferably includes a heat pump hot water storage system, and the operational data relates to the operation of one or more components of the heat pump system. In this example, the operational data preferably relates to an operation of the compressor of the heat pump system. The heating system may include a gas-powered hot water storage heating system or an electric hot water storage heating system.

The hot water unit fluid supply control system preferably including the sensor arrangement. The sensor arrangement may include one or more sensors for sensing temperature. The one or more sensors of the sensor arrangement includes a sensor for measuring a temperature of water at an outlet of the hot water unit. The control unit is in electrical communication with the one or more sensors of the sensor arrangement.

The control unit preferably allows for the volume of water to be released as treated water or usable water if, after a duration of time has elapsed from when the heating system switches from the heating-cycle to an idle cycle, the control unit determines, based on the temperature data from the sensor arrangement, that the temperature of the volume of water is at a set point temperature. The control unit may allow for the volume of water to be released as treated water or usable water if the temperature of the volume of water is at one of a plurality of set point temperatures, wherein each of the plurality of set point temperatures is associated with a period of time. For example, the plurality of set point temperatures includes a set point temperature of about 60° C. having an associated time period of about 32 minutes from an end of the heating system heating-cycle or a start of the heating system idle-cycle. By way of further example, the plurality of set point temperatures includes a set point temperature of about 55° C. having an associated time period of about 6 hours from an end of the heating system heating-cycle or a start of the heating system idle-cycle. If, during the associated period of time, the control unit determines that any water has been drawn from the hot water unit, the volume of water that is allowed by the control unit to be released from as treated water or usable water is a volume of water drawn from the hot water unit during the associated period of time subtracted from a total volume of water in the first region.

The control unit may have a timer function that is triggered when the heating system switches from the heating-cycle to an idle cycle for keeping track of the period of time. Where the control unit is configured to allow for water to be released as treated water or usable water if one of a plurality of set point temperatures are met, the control unit may have a plurality of timer functions that are triggered when the heating system switches from the heating-cycle to an idle cycle, each timer function for keeping track of a period of time associated with one of the plurality set point temperatures. Alternatively, the control unit may have one timer function to keep track of the different periods of time associated with the different set point temperatures.

The control unit may allow for the volume of water to be released as treated water or usable water if, after at least about 32 minutes has elapsed from when the heating system switches from the heating-cycle to the idle cycle, the control unit determines that the temperature of the volume of water is at least about 60° C. The control unit preferably allows for the volume of water to be released as treated water or usable water if, after about 32 minutes has elapsed, the control unit determines that the temperature of the volume of water is at least about 60° C.

The control unit may allow for the volume of water to be released as treated water or usable water if, after at least about 6 hours has elapsed from when the heating system switches from the heating-cycle to the idle cycle, the control unit determines that the temperature of the volume of water is at least about 55° C. The control unit preferably allows for the volume of water to be released as treated water or usable water if, after about 6 hours has elapsed, the control unit determines that the temperature of the volume of water is at least about 55° C.

The operational data may indicate if the heating system is in an ON-state or OFF-state, with the ON-state corresponding to when the heating system is in the heating cycle. The OFF-state corresponds to the heating system being in an idle cycle. Additionally or alternatively, the operational data may indicate a running voltage or electrical current of the heating system over a period of time, from which the control unit is able to determine if the heating system is in the heating cycle or an idle cycle.

The hot water unit fluid supply control system preferably further includes a current sensor for monitoring the operation of the heating system and for providing operational data to the control unit. Where the heating system includes a heat pump hot water storage system and the operational data includes data relating to the operation of the compressor, the current sensor detects an electrical current through the compressor of the heat pump when the compressor is in the heating cycle.

The volume of water in the first region may be about 60% to 70% of the volume of the hot water unit. For example, for a 300 L volume tank, the volume of water in the first region is about 200 L.

The heating system may, in some embodiments, include a booster coil for heating water in a second region of the hot water unit. In these embodiments, the control unit is configured to: receive booster coil data relating to an operation of the booster coil; and allow for a volume of water in the region to be released from the hot water unit as treated water or usable water based on: the booster coil data, and the temperature data. The region is preferably of the first region. The region is preferably a region of the hot water unit near the outlet of the hot water unit. The region may be an upper region of the hot water unit.

The control unit preferably allows for the volume of water to be released as treated water or usable water if, after a duration of time has elapsed from when the booster coil switches from a heating-cycle to an idle cycle, the control unit determines, based on the temperature data from the sensor arrangement, that the temperature of the volume of water is at a set point temperature. The control unit may allow for the volume of water to be released as treated water or usable water if the temperature of the volume of water in the region is at one of a plurality of set point temperatures, wherein each of the plurality of set point temperatures is associated with a period of time. For example, the plurality of set point temperatures includes a set point temperature of about 60° C. having an associated time period of about 32 minutes from an end of the booster coil heating-cycle or a start of the booster coil idle-cycle. By way of further example, the plurality of set point temperatures includes a set point temperature of about 55° C. having an associated time period of about 6 hours from an end of the heating system heating-cycle or a start of the heating system idle-cycle. If, during the associated period of time, the control unit determines that any water has been drawn from the hot water unit, the volume of water that is allowed by the control unit to be released from as treated water or usable water is a volume of water drawn from the hot water unit during the associated period of time subtracted from a total volume of water in the region.

The control unit may have a timer function that is triggered when the booster coil switches from the heating-cycle to an idle cycle for keeping track of the period of time. The timer function may be the same timer function described previously above. Where the control unit is configured to allow for water to be released as treated water or usable water if one of a plurality of set point temperatures are met, the control unit may have a plurality of timer functions that are triggered when the booster coil switches from the heating-cycle to an idle cycle, each timer function for keeping track of a period of time associated with one of the plurality set point temperatures. Alternatively, the control unit may have one timer function to keep track of the different periods of time associated with the different set point temperatures.

The control unit may allow for the volume of water to be released from the region as treated water or usable water if, after at least about 32 minutes has elapsed from when the booster coil switches from the heating-cycle to the idle cycle, the control unit determines that the temperature of the volume of water is at least about 60° C. The control unit preferably allows for the volume of water to be released from the region as treated water or usable water if, after about 32 minutes has elapsed, the control unit determines that the temperature of the volume of water is at least about 60° C. Preferably, the region corresponds to an upper region of the hot water unit and the volume corresponds to an upper volume of water in the tank.

The control unit may allow for the volume of water to be released from the region as treated water or usable water if, after at least about 6 hours has elapsed from when the booster coil switches from the heating-cycle to the idle cycle, the control unit determines that the temperature of the volume of water is at least about 55° C. The control unit preferably allows for the volume of water to be released from the region as treated water or usable water if, after about 6 hours has elapsed, the control unit determines that the temperature of the volume of water is at least about 55° C. Preferably, the region corresponds to an upper region of the hot water unit and the volume corresponds to an upper volume of water in the tank.

The booster coil data may indicate if the booster coil is in an ON-state or OFF-state, with the ON-state corresponding to when the booster coil is in the heating cycle. The OFF-state corresponds to the booster coil being in an idle cycle. Additionally or alternatively, the booster coil data may indicate a running voltage or electrical current of the booster coil over a period of time, from which the control unit is able to determine if the booster coil is in the heating cycle or an idle cycle.

The hot water unit fluid supply control system preferably further includes a current sensor for monitoring the operation of the booster coil and for providing booster coil data to the control unit. The current sensor detects an electrical current through the booster coil when the booster coil is in the heating cycle. The current sensor is preferably the same sensor used to monitor the heating system operation. For example, where the heating system includes a heat pump system, the current sensor is the same sensor used to monitor the compressor of the heat pump system.

The volume of water in the second region may be about 15% to 20% of the volume of the tank. For example, for a 300 L volume tank, the volume of water in the region is about 50 L.

Preferably, when the control unit is configured to release a volume of water from the hot water unit, a first inflow of an extra volume of water is caused to be introduced into the hot water unit. The control unit may be configured to allow the extra volume of water to be released from the hot water unit as treated water or usable water if, over a period of time after the extra volume of water was introduced to the hot water unit, the temperature of water is determined by the control unit to be at least about 55° C. The temperature may be monitored continuously or periodically.

The control unit may be configured to allow the extra volume of water to be released from the hot water unit if the temperature of water from the hot water unit is measured to be at least about 55° C. for at least about 6 hours from when the extra volume was introduced to the hot water unit. The control unit is preferably configured to allow the extra volume of water to be released from the hot water unit based on the temperature of water at an outlet of the hot water unit.

The control unit is preferably configured to track a volume of water released from the hot water unit at predetermined intervals. The volume of water released from the hot water unit would correspond to the extra volume of water that is introduced to the hot water unit. The predetermined intervals are preferably at least about 30 minutes. The predetermined intervals may be at least about 1 hour.

The control unit may a timer function that is triggered in response to an inflow of a volume of water into the hot water unit, the control unit being configured to allow the volume of water to be released from the hot water unit at treated water or usable water when the timer function indicates that at least 6 hours has elapsed. The timer function may be the same timer function previously described above in relation to the compressor operating cycle and/or the same timer function previously described above in relation to the booster coil operating cycle.

According to another aspect of the present invention, there is provided a method of controlling a hot water unit, the hot water unit having: a heating system that is operable in a heating cycle to heat up water in at least a first region of the water unit, and a sensor arrangement for sensing a temperature of water of the hot water unit, the method including: receiving, by a control unit, operational data relating to an operation of the heating system; receiving, by the control unit, temperature data from the sensor arrangement; and allowing, by the control unit, for a volume of water from the first region to be released from the hot water unit as treated water or usable water based on: the operational data, and the temperature data from the sensor arrangement.

The method preferably has one or more features or method steps corresponding to the features of the system of the previously described aspect.

The heating system preferably includes a heat pump hot water storage system, and the operational data relates to an operation of the compressor of the heat pump system. Alternatively, the operational data relates to an operation of one or more other components of the heat pump system. The heating system may include a gas-powered hot water storage heating system or an electric hot water storage heating system.

The sensor arrangement preferably includes a sensor for measuring a temperature of water at an outlet of the hot water unit.

Preferably, the method includes allowing, by the control unit, the volume of water to be released as treated water or usable water if, after a duration of time has elapsed from when the heating system switches from the heating-cycle to an idle cycle, the control unit determines, based on the temperature data from the sensor arrangement, that the temperature of the volume of water is at a set point temperature. The method may include allowing, by the control unit, for the volume of water to be released as treated water or usable water if the temperature of the volume of water is at one of a plurality of set point temperatures, wherein each of the plurality of set point temperatures is associated with a period of time. For example, the plurality of set point temperatures includes a set point temperature of about 60° C. having an associated time period of about 32 minutes from an end of the heating system heating-cycle or a start of the heating system idle-cycle. By way of further example, the plurality of set point temperatures includes a set point temperature of about 55° C. having an associated time period of about 6 hours from an end of the heating system heating-cycle or a start of the heating system idle-cycle. The method preferably includes determining, by the control unit, if, during the associated period of time, any water is drawn from the hot water unit, such that the volume of water allowed by the control unit to be released from as treated water or usable water is a volume of water drawn from the hot water unit during the associated period of time subtracted from a total volume of water in the first region.

The control unit may have a timer function and the method preferably includes triggering the timer function when the heating system switches from the heating-cycle to an idle cycle for keeping track of the period of time. Where the control unit is configured to allow for water to be released as treated water or usable water if one of a plurality of set point temperatures are met, the control unit may have a plurality of timer functions that are triggered when the heating system switches from the heating-cycle to an idle cycle, each timer function for keeping track of a period of time associated with one of the plurality set point temperatures. Alternatively, the control unit may have one timer function to keep track of the different periods of time associated with the different set point temperatures.

The method may include allowing, by the control unit, for the volume of water to be released and treated water or usable water if, after at least about 32 minutes has elapsed from when the heating system switches from the heating-cycle to the idle cycle, the control unit determines that the temperature of the volume of water is at least about 60° C. The method preferably includes allowing, by the control unit, for the volume of water to be released and treated water or usable water if, after about 32 minutes has elapsed, the control unit determines that the temperature of the volume of water is at least about 60° C.

The method may include allowing, by the control unit, for the volume of water to be released and treated water or usable water if, after at least about 6 hours has elapsed from when the heating system switches from the heating-cycle to the idle cycle, the control unit determines that the temperature of the volume of water is at least about 55° C. The method preferably includes allowing, by the control unit, for the volume of water to be released and treated water or usable water if, after about 6 hours has elapsed, the control unit determines that the temperature of the volume of water is at least about 55° C.

The heating system may, in some embodiments, have a booster coil for heating water in a region of the tank. In these embodiments, the method includes: receiving, by the control unit, booster coil data relating to an operation of the booster coil; and allowing, by the control unit, for a volume of water in the region to be released from the hot water unit as treated water or usable water based on: the booster coil data, and the temperature data.

Preferably, the method includes allowing, by the control unit, for the volume of water to be released as treated water or usable water if, after a duration of time has elapsed from when the booster coil switches from a heating-cycle to an idle cycle, the control unit determines, based on the temperature data from the sensor arrangement, that the temperature of the volume of water is at a set point temperature. The method may include allowing, by the control unit, for the volume of water to be released as treated water or usable water if the temperature of the volume of water is at one of a plurality of set point temperatures, wherein each of the plurality of set point temperatures is associated with a period of time. For example, the plurality of set point temperatures includes a set point temperature of about 60° C. having an associated time period of about 32 minutes from an end of the booster coil heating-cycle or a start of the booster coil idle-cycle. By way of further example, the plurality of set point temperatures includes a set point temperature of about 55° C. having an associated time period of about 6 hours from an end of the booster coil heating-cycle or a start of the booster coil idle-cycle. The method preferably includes determining, by the control unit, if, during the associated period of time, any water is drawn from the hot water unit, such that the volume of water allowed by the control unit to be released from as treated water or usable water is a volume of water drawn from the hot water unit during the associated period of time subtracted from a total volume of water in the region.

The control unit may have a timer function and the method includes triggering the timer function when the booster switches from the heating-cycle to an idle cycle for keeping track of the period of time. The timer function may be the same timer function described previously above. Where the control unit is configured to allow for water to be released as treated water or usable water if one of a plurality of set point temperatures are met, the control unit may have a plurality of timer functions that are triggered when the booster coil switches from the heating-cycle to an idle cycle, each timer function for keeping track of a period of time associated with one of the plurality set point temperatures. Alternatively, the control unit may have one timer function to keep track of the different periods of time associated with the different set point temperatures.

The method may include allowing, by the control unit, for the volume of water to be released from the region as treated water or usable water if, after at least about 32 minutes has elapsed from when the booster coil switches from the heating-cycle to the idle cycle, the control unit determines that the temperature of the volume of water is at least about 60° C. The method preferably includes allowing, by the control unit, for the volume of water to be released from the region as treated water or usable water if, after about 32 minutes has elapsed, the control unit determines that the temperature of the volume of water is at least about 60° C. Preferably, the region corresponds to an upper region of the hot water unit and the volume corresponds to an upper volume of water in the tank.

The method may include allowing, by the control unit, for the volume of water to be released from the region as treated water or usable water if, after at least about 6 hours has elapsed from when the booster coil switches from the heating-cycle to the idle cycle, the control unit determines that the temperature of the volume of water is at least about 55° C. The method preferably includes allowing, by the control unit, for the volume of water to be released and treated water or usable water if, after about 6 hours has elapsed, the control unit determines that the temperature of the volume of water is at least about 55° C. Preferably, the region corresponds to an upper region of the hot water unit and the volume corresponds to an upper volume of water in the tank.

Preferably, when the control unit causes a volume of water to be released from the hot water unit, a first inflow of an extra volume of water is caused to be introduced into the hot water unit. The method may further include allowing, by the control unit, for the extra volume of water to be released from the hot water unit as treated water or usable water if, over a period of time after the extra volume of water was introduced to the hot water unit, the temperature of water is determined by the control unit to be at least about 55° C. The temperature may be monitored continuously or periodically.

The method may include allowing, by the control unit, the extra volume to be released from the hot water unit if the temperature of water from the hot water unit is measured to be at least about 55° C. for at least about 6 hours from when the extra volume was introduced to the hot water unit. The method may include allowing, by the control unit, the extra volume of water to be released from the hot water unit based on the temperature of water at an outlet of the hot water unit. The control unit is preferably configured to track a volume of water released from the hot water unit at predetermined intervals. The volume of water released from the hot water unit would correspond to the extra volume of water that is introduced to the hot water unit. The predetermined intervals are preferably at least about 30 minutes. The predetermined intervals may be at least about 1 hour.

The control unit may a timer function and the method includes triggering the timer function in response to an inflow of a volume of water into the hot water unit, the control unit being configured to allow the volume of water to be released from the hot water unit at treated water or usable water when the timer function indicates that at least 6 hours has elapsed.

BRIEF DESCRIPTION OF THE DRAWINGS

The invention will now be described, by way of non-limiting example only, with reference to the accompanying drawing, in which:

FIG. 1 is a schematic view of an installation according to an embodiment of the present invention.

DETAILED DESCRIPTION

FIG. 1 illustrates an installation 100 for controlling a hot water unit, and in particular, controlling a fluid supply from the hot water unit. The installation 100 is deployed at a building such as a commercial or residential building, and is for providing a hot water supply to the building. The building has a roof and gutter for collecting water, such as rainwater, from the roof.

Water from the roof or water collected in the gutter is conveyed to a supplementary tank (or a rainwater tank) 110. Water, e.g. rainwater, stored in the supplementary tank is typically used for the purposes such as toilet flushing, clothes laundering or garden watering. That water is rarely used for other purposes involving human contact due primarily to a concern that untreated water is not safe as it is unpasteurised and may be contaminated with bacteria, such as Legionella bacteria.

Water needs be maintained at about 55° C. for at least about 6 hours or maintained at about 60° C. for at least about 32 minutes in order to be treated or usable water and fit for purpose. Any harmful bacteria would be significantly reduced in the water that is maintained at either of these set point temperatures for the respective period of time. Treated water/usable water would be safe for human contact purposes such as showering, bathing, and cleaning purposes.

The installation 100 also includes a water source 120 that is separate from the supplementary tank 110. The water source 120 supplies drinking water from a water company for example.

The installation 100 has a hot water unit (or hot water tank) 130 coupled to and in fluid communication with the supplementary tank 110. The hot water unit 130 is also coupled to and in fluid communication with the water source 120. The hot water unit 130 typically has a volume, or capacity, of 300 L. The hot water unit may have other volumes.

The installation 100 has an outlet temperature sensor fitted to a heat trap in an outlet at the top of the tank. A temperature reading may be obtained from the outlet temperature sensor about every 100 ms.

The installation 100 has a heating system, which in this embodiment, includes a heat pump heating system 140. In other embodiments, the heating system may include a gas-powered heating system or an electric heating system. The heat pump system 140 typically operates on a configured control temperature set point of 60° C. The heat pump heating system has a compressor for compressing a refrigerant thereby causing the refrigerant to generate heat, and a heat exchanger through which the refrigerant from the compressor and water from the hot water unit circulates such that the refrigerant heats the water circulating through the heat exchanger. The compressor is operable between a heating state (or heating cycle) in which it compresses the refrigerant and a non-heating state (or an idle cycle) in which it does not compress the refrigerant. The heating cycle typically begins when the water temperature is below about 55° C. and typically stops when the temperature reaches about 60° C. In the heating state, the compressor is operated to compress and thereby heat the refrigerant, which is then used to heat the water in the hot water unit 130 The compressor is operated to cause the refrigerant to heat up as long as the temperature of the water in the hot water unit is determined, based on the temperature sensor(s), to be below about 55° C. The heat pump heating system 140 is for heating water in a first region of the hot water unit. Heat losses (e.g. heat losses to the environment) are taken into account when measuring the temperature of the water. The heat losses can account for variations up to about 5° C. in the water temperature. For example, the variations may be between about 2° C. and about 4° C. The volume of water in the first region is about 60% to 70% of the volume of the tank. For example, for a 300 L volume tank, the volume of water in the first region is about 200 L. The heat pump system 140 may be part of the hot water unit 130.

The installation 100 has a sensor located at or near the compressor for determining an operation state or an operating cycle of the compressor. Data from this sensor can be used to determine whether the compressor is in the heating state or in the non-heating state. The sensor is a current sensor for example that detects an electrical current through the compressor during operation of the compressor. In other embodiments, the sensor is a voltage sensor for measuring a voltage across the compressor.

The installation 100 includes a booster coil 150 for heating water in a second region 135 of the hot water unit. After the heat pump system heats up the water in the hot water unit to the one of predetermined set point temperatures described above for the associated duration of time, the heat pump system would go into an idle (or non-heating) state and the water in the hot water unit would slowly cool down. When there has been significant usage of water of the hot water unit and the unit is substantially filled with new cold water, the booster coil 150 may be activated to heat up water in the hot water unit quickly (faster than the heat pump system) before being conveyed for usage. The booster coil may for example activate when the water in the second region drops below about 50° C. and turns off when the temperature reaches the set point. This region is of the first region and at the top of the first region. In particular, the region is an upper region of the hot water unit. The booster coil 150 is located in the second region of the hot water unit 130 and heats up the water in that region when an electrical current passes through the booster coil. The booster coil is operable between a heating state (or heating cycle) in which it heats up water in the region and a non-heating state (or an idle cycle) in which it does not perform any heating function. The volume of water in the region is about 15% to 20% of the volume of the tank. For example, for a 300 L volume tank, the volume of water in the region is about 50 L.

The sensor for determining an operation state of the booster coil is preferably the same sensor used for determining the operation state of the compressor, and can distinguish the two operations. Data from the sensor can be used to determine whether the booster coil is in the heating state (in which it is heating the water in the second region) or in the non-heating state (in which it is not heating water in the second region). The sensor is a current sensor, for example, that detects an electrical current through the booster coil during operation of the booster coil. In particular, based on the electrical current measurements, the control unit can determine if the booster coil and heat pump system is operating or if only the heat pump system is operating with the booster coil switched off. In other embodiments, the sensor is a voltage sensor for measuring a voltage across the compressor.

The installation 100 has an outlet that releases water from the hot water unit into the building.

The installation 100 further has an inlet that allows an inflow of water to the hot water unit.

The installation 100 further includes a switching device 160 for selectively switching between the supplementary tank 110 and the water source 120. The switching device 160 has a first state in which the switching device allows fluid communication from the supplementary tank to the hot water unit, and a second state in which the switching device allows fluid communication from the water source to the hot water unit. In the first state, fluid communication from the water source to the hot water unit is substantially blocked. In the second state, fluid communication from the supplementary tank to the hot water unit is substantially blocked. The switching device 160 may be the switching device described in the International Patent Publication WO 2017/210750 A1 of PCT application no. PCT/AU2017/050579 (in the name of South East Water Corporation), the entire contents of which are incorporated herein by reference.

A further switching device may be included after the hot water system outlet whereby it can completely bypass the hot water system with water from the water source 120.

The installation 100 includes a control unit 170 for receiving data from the temperature sensors, the compressor data relating to operation of the compressor of the heat pump heating system 140, the booster coil data relating to the operation of the booster coil 150. The control unit 170 is operable to monitor the operation of components of installation including components of the hot water unit 130 the heat pump heating system 140, the booster coil 150, and the temperature sensors. The control unit in some embodiments may be configured to also control the switching device 160 or other bypass devices. The control unit 170 has one or more processors that are configured to perform one or more operations. The control unit 170 further includes computer readable medium (e.g. a database, a data storage or data memory) containing computer-executable instructions that, when executed by the processor(s) of the control unit 170, cause the processor(s) to control the components of the installation system and to perform the functions described below. The control unit may be independent or may be in communication with a central system for operations and data storage or memory.

When the control unit 170 determines, from the compressor data or the booster coil data, that the compressor or booster coil is in the non-heating state, the control unit 170 checks the temperature of the water in the hot water unit. If the control unit 170 determines that the temperature of water, particularly the temperature of the water at the outlet, is at least about 60° C. after at least 32 minutes, the control unit 170 is configured to allow for a volume of water to be released from the hot water unit as treated or usable water.

If the control unit 170 determines that the temperature of water, particularly temperature of the water at the outlet, drops below 60° C. after 32 minutes but is above at least about 55° C., the control unit 170 is configured to allow for a volume of water to be released from the hot water unit as treated or usable water if it is determined that the temperature of water is about 55° C. after 6 hours.

On the other hand, if the control unit 170 determines that the temperature of water, particularly the temperature of water at the outlet, drops below 55° C., then the control unit 170 is configured to cause the switching device 160 or other bypass device to be activated.

The control unit 170 implements one or more timer functions to keep track of time before releasing water from the hot water unit. When the control unit 170 determines that the compressor or booster coil is not in the heating state, the control unit 170 is configured to trigger a first timer function. If, once the first timer function reaches 32 minutes, the control unit 170 determines that the temperature is at least about 60° C., the control unit 170 releases a volume of water from the hot water unit as treated or usable water and resets the timer. On the other hand, if the control unit 170 determines that the temperature is below 60° C. but at least about 55° C., the first timer function continues to count. If, once the first timer function reaches 6 hours, the control unit 170 determines that the temperature is at least about 55° C., the control unit 170 releases a volume of water from the hot water unit as treated water or usable water and resets the timer. A second timer function may be used, that runs in parallel with the first timer, to keep track of when 6 hours has elapsed. Further alternatively, the operation of the booster coil may trigger one or more timer functions that is/are separate from one or more timer functions that are triggered by the operation of the compressor.

If a volume of water has been previously heated in the hot water unit to the predetermined set point temperature and maintained at that set point temperature for the associated duration of time, and that volume of water subsequently cools down, the control unit allows the user to draw this water from the hot water unit as treated or usable water without having to reheat and maintain this volume of water at the set point temperature. If, during the associated period of time (e.g. during the 32 minutes period after the compressor turns off), the control unit determines that any of this previously heated volume of water has been drawn from the hot water unit, the volume of water that is allowed by the control unit to be released from as treated water or usable water would be the volume of water drawn from the hot water unit during the associated period of time subtracted from a total volume of water in the first region. Thereby, the system allows for better utilisation of the water from the supplementary tank by taking into account the water that had been previously heated and held at the set point temperature despite the lower exit temperature.

The control unit 170 can be configured to monitor the temperature of water in the hot water unit independent of the heat pump cycle. A total volume of water that is released from the hot water unit is measured in 30 minute intervals. If the temperature of freshly introduced cold water in the hot water unit is at least about 55° C. for more than about 6 hours, that water is added to the usable volume that is allowed by the control unit to be released as treated or usable water. Temperature gradients will occur in the hot water unit. For operational control the temperature within the heat pump unit is quantified or discretised into different distinct zones or layers with each zone or layer being composed of water having a temperature lying within a distinct temperature range. The hot water unit for example may have up to six zones. A volume of cold water introduced to the hot water unit remains at a bottom of the hot water unit below the heated water. This volume of water would heat up when the heating system is in a heating cycle. As the control unit releases one or more volumes of water from the hot water unit, one or more new volumes of cold water would be introduced into the hot water unit, causing the heated volume of water to rise towards the outlet. When the water control unit determines that the heated volume of water has been in the hot water unit for at least 6 hours and the outlet temperature was measured to be at least 55° C. during that 6 hours, the control unit is configured to allow this volume of water to be released from the hot water unit as treated or usable water.

In some embodiments of the present invention, the control unit 170 may be in communication with a solar energy monitoring system that monitors solar energy collected by a solar energy collection system. In these embodiments, the hot water unit is configured to receive energy for water heating purposes from the solar energy system. In the event that the control unit 170 detects an excess solar energy generation from the solar energy system, which would be detected based on measurements/readings from an energy meter to the building and a current transducer of the solar energy monitoring system that monitors the solar energy generation by the solar energy system, the control unit 170 is configured to cause the excess solar energy to be stored in the hot water unit. In particular, the control unit 170, in the event of excess solar energy being detected, is configured to transmit a control signal to the heat pump system and/or booster coil to cause the heat pump system and/or booster coil to heat the water in the tank. In a particular example, the control unit 170 is configured to cause the excess solar energy from the solar energy system to be used to heat a volume of the water in the hot water unit to a higher set point temperature, which is greater than 60° C., for example about 65° C.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A hot water unit fluid supply control system for a hot water unit, the hot water unit having:
   a heating system that is operable in a heating state to heat up water in at least a first region of the hot water unit, and a sensor arrangement for sensing a temperature of water in the hot water unit, the control system comprising a control unit configured to:

receive operational data relating to an operation of the heating system;

receive temperature data from the sensor arrangement;

trigger one or more timer functions when the heating system switches from the heating state to an idle state, and in response to an inflow of a volume of water into the hot water unit; and allow for a volume of water from the first region to be released from the hot water unit as treated water or usable water based on:
the operational data, and
the temperature data from the sensor arrangement;

wherein the control unit is configured to allow for the volume of water to be released from the hot water unit as treated water or usable water if, the control unit determines, based on the temperature data from the sensor arrangement, that the temperature of the volume of water is at or above one of a plurality of set point temperatures, each set point temperature of the plurality of set point temperatures having an associated period of time, and after the associated period of time has elapsed as determined by the timer function.

2. The hot water unit fluid supply control system of claim 1, wherein the heating system includes a heat pump system, and the operational data relates to the operation of one or more components of the heat pump system.

3. The hot water unit fluid supply control system of claim 2, wherein the operational data relates to an operation of a compressor of the heat pump system.

4. The hot water unit fluid supply control system of claim 1, further including the sensor arrangement, wherein the sensor arrangement includes one or more sensors for sensing temperature and wherein the one or more sensors of the sensor arrangement includes a sensor for measuring a temperature of water at an outlet of the hot water unit.

5. The hot water unit fluid supply control system of claim 1, wherein the control unit determines if, during the associated period of time, any water is drawn from the hot water unit and the volume of water allowed by the control unit to be released from as treated water or usable water is a volume of water drawn from the hot water unit during the associated period of time subtracted from a total volume of water in the first region.

6. The hot water unit fluid supply control system of claim 1, wherein the plurality of set point temperatures includes a set point temperature of about 60° C. having an associated period of time of about 32 minutes.

7. The hot water unit fluid supply control system of claim 1, wherein the plurality of set point temperatures includes a set point temperature of about 55° C. having an associated time period of about 6 hours.

8. The hot water unit fluid supply control system of claim 1, further including a current sensor for monitoring the operational data of the heating system and for providing operational data to the control unit.

9. The hot water unit fluid supply control system of claim 1, wherein the volume of water in the first region is about 60% to 70% of the volume of the hot water unit.

10. The hot water unit fluid supply control system of claim 1, wherein the heating system includes a booster coil for heating water in a second region of the hot water unit, and the control unit is configured to:

receive booster coil data relating to an operation of the booster coil; and allow for a volume of water from the second region to be released from the hot water unit as treated water or usable water based on
the booster coil data, and
the temperature data.

11. The hot water unit fluid supply control system of claim 10, wherein the control unit allows for the volume of water to be released as treated water or usable water if, after a period of time has elapsed from when the booster coil switches from a heating-state to an idle state, the control unit determines, based on the temperature data from the sensor arrangement, that the temperature of the volume of water in the second region is at one of a plurality of set point temperatures, each set point temperature of the plurality of set point temperatures having an associated period of time.

12. The hot water unit fluid supply control system of claim 11, wherein the plurality of set point temperatures includes a set point temperature of about 60° C. having an associated time period of about 32 minutes.

13. The hot water unit fluid supply control system of claim 11, wherein the plurality of set point temperatures includes a set point temperature of about 55° C. having an associated time period of about 6 hours.

14. The hot water unit fluid supply control system of claim 10, further including a current sensor for monitoring the operation of the booster coil and for providing booster coil data to the control unit.

15. The hot water unit fluid supply control system of claim 10, wherein the volume of water in the second region is about 15% to 20% of the volume of the hot water unit.

16. The hot water unit fluid supply control system of claim 1, wherein when the control unit is configured to release a volume of water from the hot water unit, a first inflow of an extra volume of water is caused to be introduced into the hot water unit, wherein the control unit is configured to allow the extra volume of water to be released from the hot water unit as treated water or usable water if, over a period of time after the extra volume of water was introduced to the hot water unit, the temperature of water is determined by the control unit to be at least 55° C.

17. The hot water unit fluid supply control system of claim 16, wherein the control unit allows the extra volume to be released from the hot water unit if the temperature of water from the hot water unit is measured to be at least about 55° C. for at least about 6 hours from when the extra volume was introduced to the hot water unit.

18. A method of controlling a hot water unit, the hot water unit having:

a heating system that is operable in a heating state to heat up water in at least a first region of the hot water unit, and a sensor arrangement for sensing a temperature of water in the hot water unit, the method including:

receiving, by a control unit, operational data relating to an operation of the heating system;

receiving, by the control unit, temperature data from the sensor arrangement;

triggering, by the control unit, one or more timer functions when the heating system switches from the heating state to an idle state, and in response to an inflow of a volume of water into the hot water unit; and allowing, by the control unit, for a volume of water from the first region to be released from the hot water unit as treated water or usable water based on:

the operational data, and the temperature data from the sensor arrangement;

wherein the control unit allows for the volume of water to be released from the hot water unit as treated water or usable water if, the control unit determines, based on the temperature data from the sensor arrangement, that the temperature of the volume of water is at or above one of a plurality of set point temperatures, each set point temperature of the plurality of set point temperatures having an associated period of time, and after the associated period of time has elapsed as determined by the timer function.

19. The method of claim 18, wherein the heating system includes a heat pump system, and the operational data relates to an operation of a compressor of the heat pump system or of one or more other components of the heat pump system.

20. The method of claim 18, wherein the sensor arrangement includes a sensor for measuring a temperature of water at an outlet of the hot water unit.

21. The method of claim 18, wherein the method includes determining, by the control unit, if, during the associated period of time, any water is drawn from the hot water unit; and wherein the volume of water allowed by the control unit to be released from as treated water or usable water is a volume of water drawn from the hot water unit during the associated period of time subtracted from a total volume of water in the first region.

22. The method of claim 18, wherein the plurality of set point temperatures includes a set point temperature of about 60° C. having an associated time period of about 32 minutes.

23. The method of claim 18, wherein the plurality of set point temperatures includes a set point temperature of about 55° C. having an associated time period of about 6 hours.

24. The method of claim 18, wherein the heating system includes a booster coil for heating water in a second region of the hot water unit, and the method includes:

receiving, by the control unit, booster coil data relating to an operation of the booster coil; and allowing, by the control unit, for a volume of water from the second region to be released from the hot water unit as treated water or usable water based on:

the booster coil data, and the temperature data.

25. The method of claim 24, further including allowing, by the control unit, for the volume of water from the second region to be released as treated water or usable water if the temperature of the volume of water is at one of a plurality of set point temperatures, wherein each of the plurality of set point temperatures is associated with a period of time.

26. The method of claim 25, wherein the plurality of set point temperatures includes a set point temperature of about 60° C. having an associated time period of about 32 minutes.

27. The method of claim 25, wherein the plurality of set point temperatures includes a set point temperature of about 55° C. having an associated time period of about 6 hours.

28. The method of claim 18, wherein when the control unit causes a volume of water to be released from the hot water unit, a first inflow of an extra volume of water is caused to be introduced into the hot water unit, the method further including:

allowing, by the control unit, for the extra volume of water to be released from the hot water unit as treated water or usable water if, over a period of time after the extra volume of water was introduced to the hot water unit, the temperature of water is determined by the control unit to be at least 55° C.

29. The method of claim 28, further including:

allowing, by the control unit, the extra volume to be released from the hot water unit if the temperature of water from the hot water unit is measured to be at least about 55° C. for at least about 6 hours from when the extra volume was introduced to the hot water unit.

* * * * *